(12) United States Patent
McLemore et al.

(10) Patent No.: US 9,260,163 B2
(45) Date of Patent: Feb. 16, 2016

(54) LEAD-IN CABLE WITH A REPLACEABLE PORTION AND METHOD

(71) Applicant: CGG SERVICES SA, Massy (FR)

(72) Inventors: Frank McLemore, Stafford, TX (US); Pierre Le Roux, Massy (FR); Philippe Dumazet, Bois de gand (FR)

(73) Assignee: CGG SERVICES SA, Massy (FR)

( * ) Notice: Subject to any disclaimer, the term of this patent is extended or adjusted under 35 U.S.C. 154(b) by 17 days.

(21) Appl. No.: 14/219,366

(22) Filed: Mar. 19, 2014

(65) Prior Publication Data

US 2015/0020726 A1    Jan. 22, 2015

Related U.S. Application Data

(60) Provisional application No. 61/846,783, filed on Jul. 16, 2013, provisional application No. 61/846,774, filed on Jul. 16, 2013.

(51) Int. Cl.
*B63B 21/66* (2006.01)
*B63B 9/04* (2006.01)
*G01V 1/38* (2006.01)

(52) U.S. Cl.
CPC . *B63B 21/66* (2013.01); *B63B 9/04* (2013.01); *G01V 1/3843* (2013.01); *B63B 21/663* (2013.01); *Y10T 29/4973* (2015.01)

(58) Field of Classification Search
CPC ...................................................... B63B 21/66
USPC ..................... 114/243–245; 367/20
See application file for complete search history.

(56) References Cited

U.S. PATENT DOCUMENTS

| | | | | |
|---|---|---|---|---|
| 3,713,085 A * | 1/1973 | Laurent | G01V 1/201 367/154 |
| 4,222,340 A * | 9/1980 | Cole | B63B 21/66 114/245 |
| 4,317,185 A * | 2/1982 | Thigpen | G01V 1/201 114/242 |
| 4,955,012 A * | 9/1990 | Bledsoe | G01V 1/208 367/149 |
| 5,183,966 A * | 2/1993 | Hurtado | G01V 1/201 174/19 |
| 5,568,447 A * | 10/1996 | Williams | G01V 1/201 114/247 |
| 5,601,046 A * | 2/1997 | Berglund | B63B 21/66 114/244 |
| 5,861,575 A * | 1/1999 | Broussard | G02B 6/4459 174/20 |
| 6,034,923 A * | 3/2000 | Wooters | G01V 1/201 181/110 |
| 6,483,776 B1 * | 11/2002 | Rokkan | G01V 1/201 367/165 |
| 6,827,597 B1 * | 12/2004 | Metzbower | H01R 13/502 439/320 |
| 7,377,224 B2 * | 5/2008 | Ryan | G01V 1/3826 114/244 |
| 8,619,496 B2 * | 12/2013 | Hartland | B63B 21/66 114/253 |
| 8,857,360 B2 * | 10/2014 | Rinnan | G01V 1/3826 114/245 |
| 8,891,331 B2 * | 11/2014 | Barker | G01V 1/3826 114/244 |
| 8,917,574 B2 * | 12/2014 | Gallagher | G01V 1/201 367/15 |
| 2004/0035349 A1 * | 2/2004 | Barker | B63B 21/663 114/243 |
| 2004/0125698 A1 * | 7/2004 | George | G01V 1/201 367/20 |
| 2006/0254490 A1 * | 11/2006 | Ryan | G01V 1/3826 114/245 |
| 2009/0185170 A1 * | 7/2009 | Maas | G01V 1/226 356/73.1 |
| 2013/0139742 A1 * | 6/2013 | Macquin | B63B 21/66 114/244 |
| 2015/0020726 A1 * | 1/2015 | McLemore | B63B 9/04 114/244 |

* cited by examiner

*Primary Examiner* — Lars A Olson
*Assistant Examiner* — Jovon Hayes
(74) *Attorney, Agent, or Firm* — Patent Portfolio Builders PLLC

(57) ABSTRACT

A lead-in cable used to tow a streamer behind a vessel includes a replaceable portion removably connected between a portion of the lead-in cable attached to the vessel and the streamer. Alternatively a lead-in additional cable is inserted between a lead-in cable and a towed streamer. The replaceable portion or the lead-in additional cable covers a portion most likely to be damaged between the streamer and the towing vessel.

20 Claims, 9 Drawing Sheets

LEAD-IN CABLE WITH A REPLACEABLE PORTION AND METHOD

CROSS REFERENCE TO RELATED APPLICATIONS

This application claims priority and benefit from U.S. Provisional Patent Application No. 61/846,774 filed Jul. 16, 2013, for "Additional Lead In Section" and Provisional Patent Application No. 61/846,783 filed Jul. 16, 2013, for "Short Sacrificial Lead-in," the entire contents of which are incorporated in their entirety herein by reference.

BACKGROUND

1. Technical Field

Embodiments of the subject matter disclosed herein generally relate to methods and systems and, more particularly, to mechanisms and techniques for a lead-in cable having a replaceable portion or a lead-in additional cable configured to be mounted between a lead-in cable and a streamer.

2. Discussion of the Background

Oil companies frequently use images obtained by seismic and/or electromagnetic exploration of underground geological structures to select sites for drilling wells.

A marine survey system, as illustrated in FIG. 1, includes a vessel 10 towing a source array 20 and streamers 30 (only one side relative to sail-line S is shown) in direction T. Vessel 10 pulls streamers 30 via lead-in cables 35 (only two labeled in FIG. 1), which are strength members able to convey the necessary towing force. The lead-in cables customary house functional cables such as an electric cable to transmit power from the towing vessel to the streamers. Streamers 30 are usually towed to have parallel trajectories at distances d in the range of 50 and 150 m there-between. In order to achieve this arrangement, one or more deflectors or paravanes such as 37A and 37B (connected to vessel 10 via wide tow lines 39A and 39B and to the outermost lead-in cable via a spur line 40) pull the streamers laterally relative to the towing direction T. Separation ropes 33 (only two labeled in FIG. 1) that are connected between lead-in cables 35 at locations 31 (close to the streamer 30's upstream end) prevent distances between adjacent streamers from exceeding the distance d. The lead-in cables, which have a length in the range of 1000 to 1500 m (depending how far they reach laterally relative to the sail-line S), are prone to damage in portions where the separation ropes are attached.

There are other portions of the lead-in cables which are prone to damage. For example, as illustrated in FIG. 2, lead-in cable 35 is usually heavy and may sag at a depth h below a desired depth of streamer's 30 head (the ideal shape is illustrated as a horizontal dashed line in FIG. 2). A float 36 may be connected to lead-in cable 35 via cable 34 at a location 38 (which is close to the streamer 30's head) to lift the lead-in cable at an intended depth. The portions surrounding locations 31 and 38 (where separation rope(s) 33 and cable 34 are attached to lead-in cable 35) are more prone to damage due to the additional lateral forces (i.e., forces that are not along the lead-in cable). To alleviate this problem, these portions are reinforced using bend restrictors.

In addition to illustrating the portions more prone to damage than the rest of the lead-in cable, FIG. 2 also illustrates the manner of acquiring information regarding the geological structure under seafloor 42. A wave 22 (e.g., a seismic or an electro-magnetic wave) generated by source array 20 penetrates seafloor 42 and is at least partially reflected at an interface 44 between a layer 43 inside which wave propagates with a first velocity and a layer 45 inside which wave 22 propagates with a second velocity different from the first velocity. Reflected wave 24 is then detected by detectors carried by streamer 30. Note that streamer 30 maintains an intended depth profile (which is shown parallel to water surface 15, but may also be a curved depth-varying profile) using position controlling devices 32A and 32B (e.g., birds).

Inspecting and, if necessary, repairing the damaged portions of lead-in cables during at sea (i.e., onboard the vessel) takes a relatively long time. Since onboard time is very expensive, it is desirable to find methods to reduce maintenance time related to the lead-in cables and to prolong usage period thereof.

SUMMARY

Replaceable lead-in cable portions designed to cover the locations most prone to damage may be built-in or added to lead-in cables used to tow streamers in marine survey systems, to reduce maintenance time related to the lead-in cables and to extend the lead-in cable's lifespan.

According to an embodiment, there is a lead-in cable usable to tow a streamer, transmit data, distribute power, transmit and/or receive command prompts during a marine survey. The lead-in cable includes a first portion configured to be attached to a towing device and a second replaceable portion configured to be removably connected between the first portion and the streamer. The second replaceable portion includes a body housing a functional cable, an upstream connector and a downstream connector. The upstream connector is configured to attach the body to the first portion and to connect the functional cable to the first portion such that to ensure functional communication with the vessel. The downstream connector is configured to attach the body to the streamer and to connect the functional cable to the streamer.

According to another embodiment, there is a lead-in additional cable configured to be inserted between a lead-in cable and a streamer. The lead-in additional cable has a body housing a functional cable, an upstream connector and a downstream connector. The upstream connector is configured to attach the body to the lead-in cable and to connect the functional cable to the lead-in cable such that to ensure functional communication. The downstream connector is configured to attach the body to the streamer and to connect the functional cable to the streamer.

According to yet another embodiment, there is a method for lead-in cable related maintenance or repair. The method includes disconnecting a replaceable portion of a lead-in cable from a streamer and from an upstream portion of the lead-in cable attached to a towing vessel. The method further includes connecting another portion of lead-in cable having a same structure as the replaceable portion, to the upstream portion of the lead-in cable, and connecting the lead-in cable to the streamer.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are related to lead-in cables used to connect streamers to a towing vessel during a seismic survey and maintenance methods related to lead-in cables. Similar embodiments and methods may be used relative to other cables used to tow equipment (e.g., the wide tow lines).

Reference throughout the specification to "one embodiment" or "an embodiment" means that a particular feature, structure or characteristic described in connection with an embodiment is included in at least one embodiment of the subject matter disclosed. Thus, the appearance of phrases "in one embodiment" or "in an embodiment" in various places throughout the specification is not necessarily referring to the same embodiment. Further, the particular features, structures or characteristics may be combined in any suitable manner in one or more embodiments.

Some embodiments described below are directed to lead-in cables having a replaceable portion that extends over one or more locations where the lead-in cable is more prone to damage than the rest of its span. Some other embodiments are directed to a lead-in additional cable configured to retrofit a lead-in cable to streamer link such that to replace the lead-in cable in at least one location where the lead-in cable is more prone to damage. Other embodiments are directed to maintenance methods that save time by replacing a removable lead-in cable portion, which was most likely damaged, postponing inspection and repairs, which may be necessary.

Figure 3:
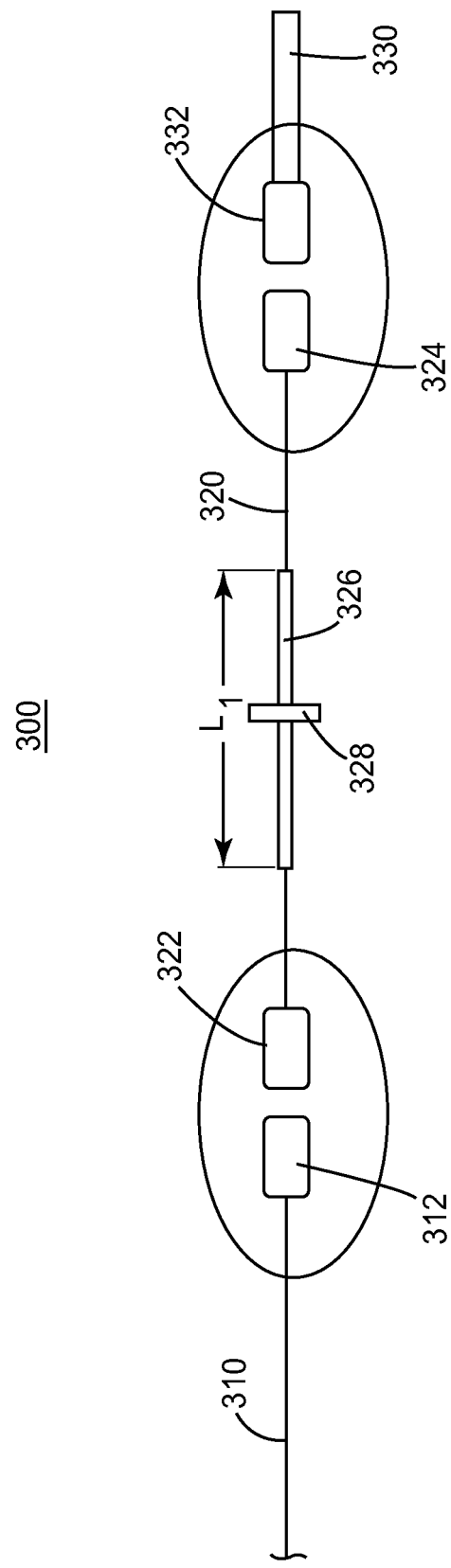
FIG. 3 is a lead-in cable according to an embodiment.

FIG. 3 illustrates a lead-in cable 300 usable to tow a streamer behind a vessel during a marine survey according to an embodiment. Lead-in cable 300 includes a frontal (or first) portion 310 (only a segment thereof shown), which is configured to be attached to the vessel (not shown), and a replaceable portion 320 configured to be removably connected between frontal portion 310 and streamer 330.

Figure 4:
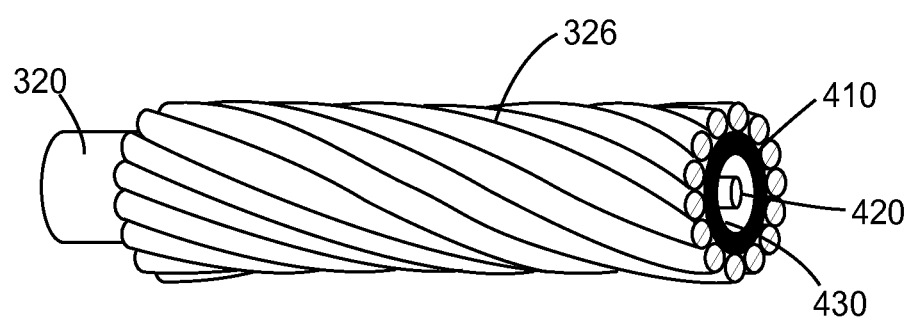
FIG. 4 is a lead-in cable view illustrating a bend restrictor according to an embodiment and cables inside a tubular section thereof according to an embodiment.

Replaceable portion 320 has an upstream connector 322 that links replaceable portion 320 to frontal portion 310 (i.e., to a connector 312 thereof) and a downstream connector 324 that links replaceable portion 320 to streamer 330 (i.e., to a connector 332 thereof). A bend restrictor 326 surrounds a length L1 of replaceable portion 320, length L1 including a location 328 where at least one separation rope is attached. The bend restrictor reinforces the surrounded section which is more prone to be damaged due to the lateral forces exerted in addition to the forces along the cable. Bend restrictor 326 may be a preformed helical wrap-on rod as illustrated in FIG. 4.

Replaceable portion 320 includes a tubular body 410 housing inside an electric power cable 420. The term "tubular" is customarily, but it should not be considered limiting relative to the body's shape, the term indicating a hollow body configured to house a cable. Upstream connector 322 is configured to electrically connect electric power cable 420 to a power supply cable (not shown) inside frontal portion 310, and downstream connector 324 is configured to electrically connect electric power cable 420 to a streamer electric cable (not shown) inside streamer 330. Tubular body 410 includes a strength member (made, for example, of metallic flexible material) capable to withstand the tension caused by transmitting the towing force to the streamer. The strength member may be covered by an outer isolating jacket made, for example, of polyurethane, polyethylene or polyester and combinations thereof. The power supply cable is electrically isolated from the tubular body and not subjected to tension for transmitting the towing force.

In addition to (or instead of) the electric power cable, tubular body 410 may also house a data communication cable 430 (e.g., an optical fiber). When the data communication cable is present, the upstream and downstream connectors are further configured to connect the data communication cable with a lead-in data communication cable housed by the frontal portion of the lead-in cable and with a streamer data communication cable housed by the streamer respectively. Data to and from the receiver carried by the streamer may then be transmitted to the vessel via the data communication cables. Thus, the replaceable portion is configured to enable the power and data flow between the vessel and the streamer. More generally, the tubular body houses one or more functional cables such as a power cable, a telemetry cable, a control signal transmission cable, a data cable and a fiber optic cable. The upstream and downstream connectors are configured to connect the one or more cables such that to enable functional communication therethrough between the vessel and the streamer.

Figure 5:
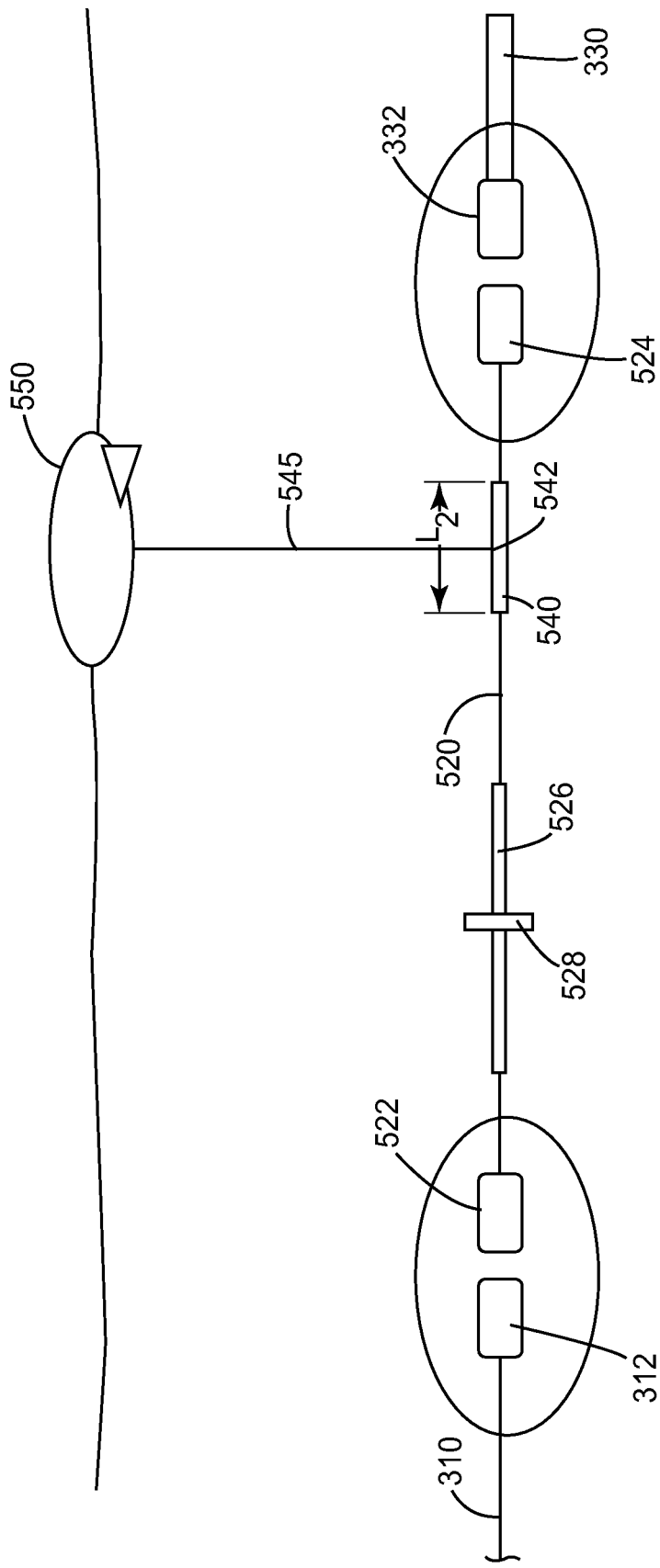
FIG. 5 is a lead-in cable according to another embodiment.

The replaceable portion may extend over more than one location prone to damage. FIG. 5 illustrates a replaceable portion 520 according to another embodiment. Replaceable portion 520 includes an upstream connector 522, a downstream connector 524, and a bend restrictor 526 at location 528 similar to respective components of replaceable portion 320. Additionally, a second bend restrictor 540 surrounds a second length L2 at a location 542 at which a float 550 is connected to replaceable portion 520 via a cable 545. Float 550 and cable 545 may be configured to provide a variable lifting force (as a variable volume of the float is under the water surface) to maintain location 542 at a predetermined depth. Alternatively, float 550 and cable 545 may be configured to provide a constant lifting force (if the float is completely submerged). Second length L2 may be shorter than length L1; for example, L1 may be about 12-15 m and L2 may be about 2-3 m. In one embodiment the overall length of the replaceable portion is about 20 m. Note that in this document, a length having about a specified length in meters (m) indicate a range around the specified length within which the overall structure does not change (e.g., the deviations may be up to 10% of the specified length).

Figure 6:
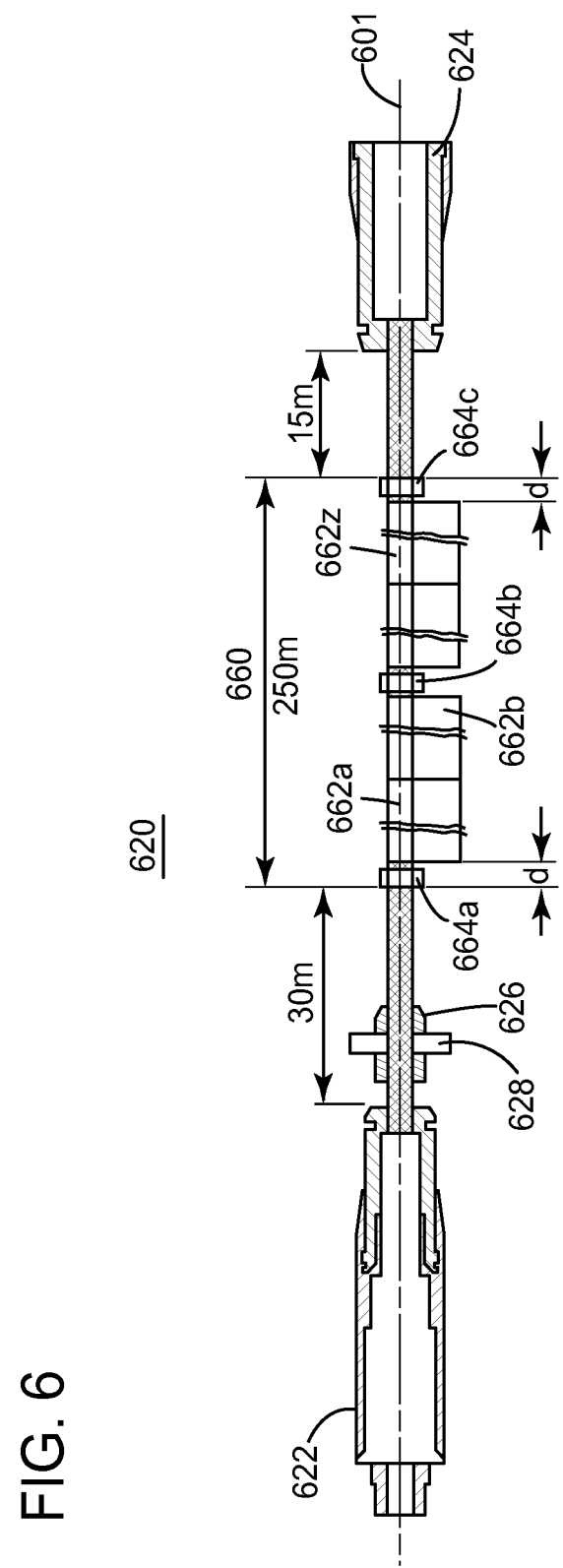
FIG. 6 is a lead-in cable according to another embodiment.
Figure 8:
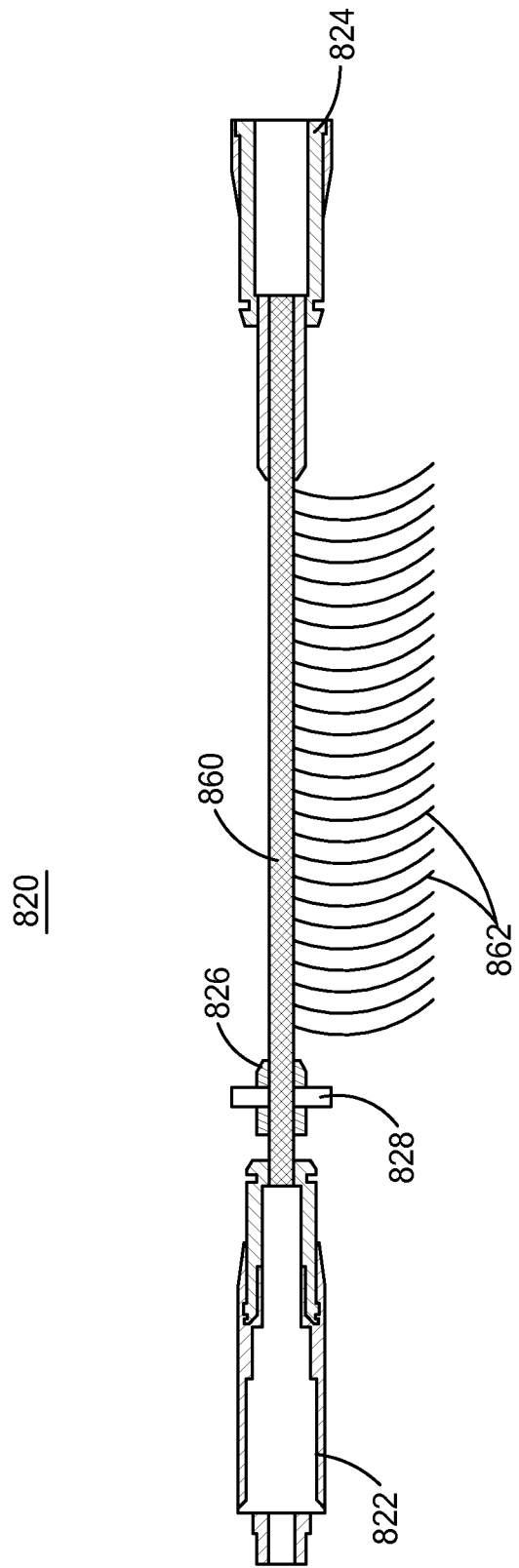
FIG. 8 is a lead-in cable according to yet another embodiment.

The replaceable portion may also include a section covered by fairings as illustrated in FIGS. 6 and 8. Fairings are structures on an outer surface of a towed cable that are designed to streamline water flow around the cable. Presence of fairings has at least two beneficial effects: (1) a reduction of normal drag and (2) reducing cable vibration due to vortex shedding (commonly known as cable strum). The reduction of the normal drag leads to fuel economy. The reduction of cable vibration enhances the towed structure's stability. Fairings are available in a variety of sizes and styles such as ribbon fairings, hairy fairings and hard fairings.

Most of the lead-in cables' outer surfaces are covered by ribbon fairings formed for example from polyurethane as part of the lead-in cable's outer jacket. Because the lead-in cables are not aligned with the tow direction, lateral forces generated by the water flow push the lead-in cables towards the sail-line. The magnitude of such a lateral force is proportional with the angle made by the lead-in cable with the towing direction (i.e., larger for the outer lead-in cable). These lateral forces may be reduced by presence of hairy fairings and particularly of solid fairings, making it possible to achieve a larger separation between cables. Therefore, about 2-300 m long sections close to the streamer's head (where the lateral forces are larger than in other cable sections because the angle with the sail line is larger) are covered with hairy fairings or solid fairings. Hairy fairings are preferably used for inner lead-in cables (i.e., the lead-in cables close to the sail-line) and solid fairings are preferably used for the outer lead-in cables. However, due to the additional lateral forces, the lead-in cable sections covered by hairy fairings or solid fairings are more prone to damage than the sections covered by ribbon fairings or not covered by fairings.

FIG. 6 illustrates a replaceable portion 620 of lead-in cable covered by solid fairings, according to an embodiment. Replaceable portion 620 in FIG. 6, which has an upstream connector 622, a downstream connector 624, and a bend restrictor 626 at location 628, includes also section 660 covered by wings 662a, 662b, . . . , 662z. While there may be about 30 m between upstream connector 622 and section 660, and about 15 m between section 660 and downstream connector 624, section 660 has a length of about 250 m (the overall length of replaceable portion 600 being about 300 m).

Wings 662a, 662b, . . . , 662z may be interleaved with anti-stacking rings such as 664a, 664b and 664c, which have a length d of about 0.07-0.09 m and are placed at a beginning of section 660, its end and at about 5 m intervals along section 660. When under tension, the diameter of the cable gets smaller. Absent such anti-stacking rings, the wings would slide downstream piling near the downstream connector.

Figure 7:
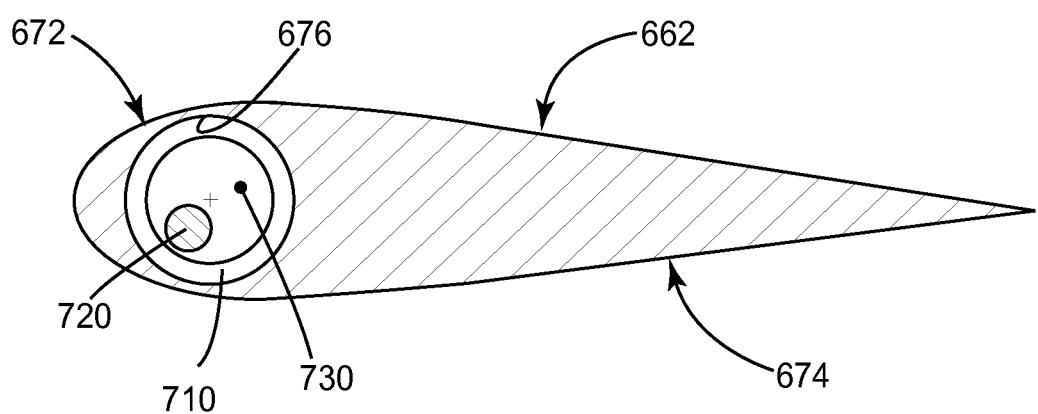
FIG. 7 is a cross-section showing the profile of a solid fairing's wing according to an embodiment.

A cross-section of section 660 in a plane perpendicular to lead-in cable's longitudinal axis 601 is illustrated in FIG. 7, to show shape of a wing 662 according to an embodiment. Wing 662 has a rounded leading edge 672 and a tapered trailing edge 674. Lead-in cable's tubular body 710 inside which may be an electric power cable 720 and a data communication cable 730 passes through a hole 676 of wing 662.

Further, FIG. 8 illustrates a replaceable portion 820 of lead-in cable covered by hairy fairings, according to an embodiment. Replaceable portion 820 has an upstream connector 822, a downstream connector 824, and a bend restrictor 826 at location 828, and it includes also section 860 covered by hairy fairings 862 (which may be 6-8 inches long). Distances between upstream connector 822 and section 860, between section 860 and downstream connector 824, and section 860's length are similar to corresponding lengths in FIG. 6.

Although the lead-in cables illustrated in FIGS. 5, 6 and 8 include at least two portions one of which is more likely to be damaged than the other, lead-in cables may, in principle, include multiple segments (i.e., more than two portions) such that each segment to include no more than one portion prone to damage.

As discussed above for different embodiments, the replaceable portions of lead-in cables may be as short as 20 m and as long as 300 m. Considering the typical length of a lead-in cable of 1000-1500 m, the replaceable portions of lead-in cables do not exceed ⅓ of the total length in one embodiment. Thus, most of the lead-in cable (i.e., the rest more than ⅔ of the total length) can be used for longer time than the replaceable portion. Therefore, the use of replaceable portions yields economic benefits using for longer time most of the lead-in cable.

Replaceable portions 320, 520, 620 and 820 described above have been presented as parts of a lead-in cable. According to other various embodiments, lead-in additional cables have structures similar to the above-described replaceable portion and are configured to retrofit a marine seismic survey system using lead-in cable to tow streamers. In other words, instead of a lead-in cable being manufactured to have a replaceable portion, a lead-in additional cable is inserted between an existing lead-in cable and a streamer. This lead-in additional cable is designed to prevent most likely damage, for example, to cover a portion between the vessel and the streamer where a separation rope to another lead-in cable is attached.

Thus, according to one embodiment, a lead-in additional cable has a tubular body housing a functional cable (e.g., an electric power cable). At an upstream end, the lead-in additional cable has an upstream connector configured to attach the tubular body to the lead-in cable and to connect the functional cable to the lead-in cable such that to ensure functional communication with the vessel. For example, the upstream connector may be configured to electrically connect the electric power cable to an electric cable inside the lead-in cable. At a downstream end, the lead-in additional cable has downstream connector configured to attach the tubular body to the streamer and to connect the functional cable to the streamer. For example, the downstream connector may be configured to electrically connect the electric power cable to a streamer electric cable. The lead-in additional cable preferably covers a portion of cable connection between the streamer and a towing vessel, which portion is most likely to be damaged.

Figure 1:
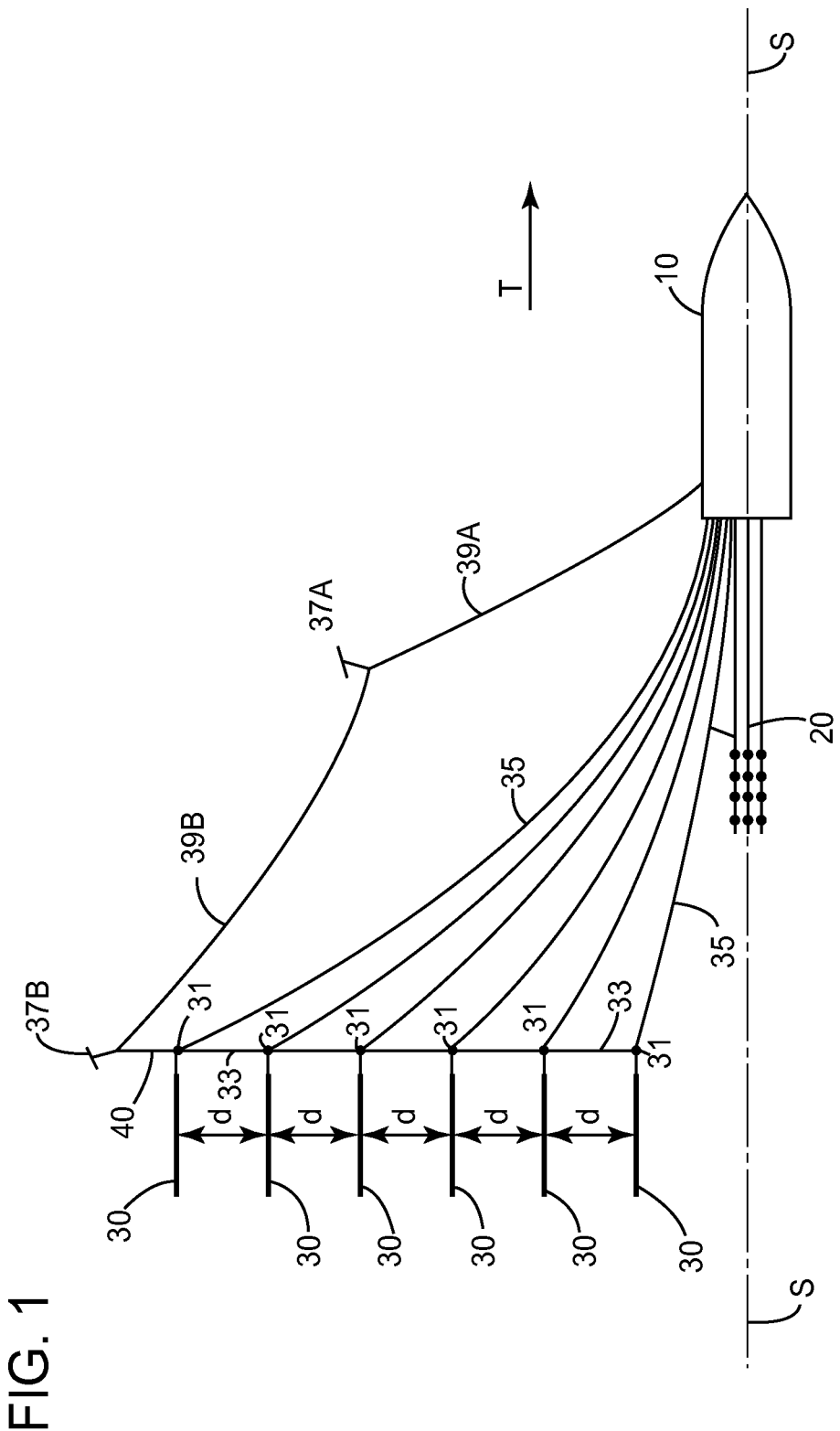
FIG. 1 is a bird-eye view of a part of a typical marine seismic data acquisition system.
Figure 2:
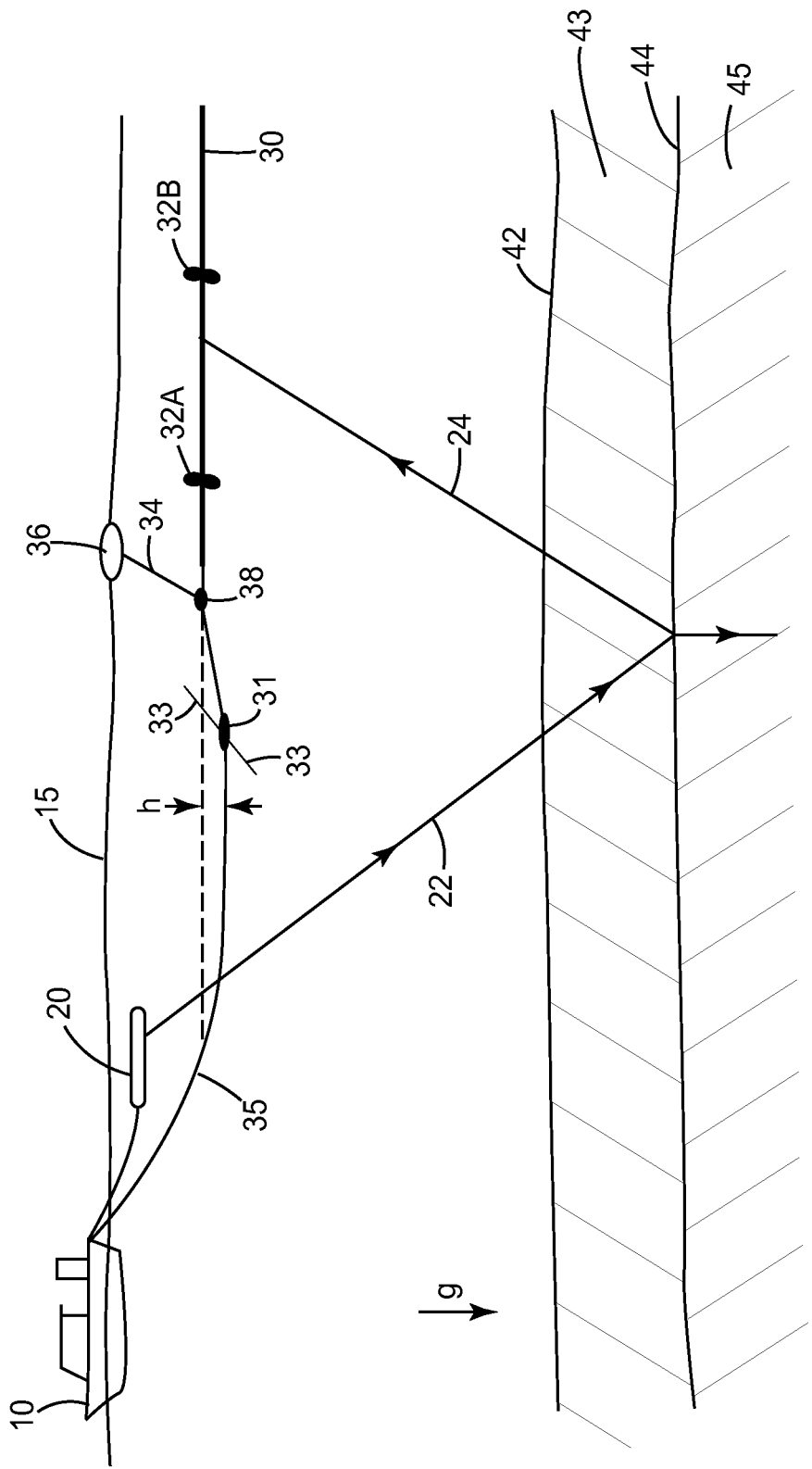
FIG. 2 is a vertical view of a part of a typical marine seismic data acquisition system.

For example, in one embodiment the lead-in additional cable covers the portion where at least one separation rope is attached (i.e., two separation ropes for most lead-in cables, and one separation rope and the spur line for the outermost lead-in cable as illustrated in FIG. 1). The lead-in additional cable may then have a bend restrictor configured to surround the tubular body around the location where the at least one separation rope is attached. In another example, hairy fairings or solid fairings may be pre-formed on an outer surface of the tubular body.

Figure 9:
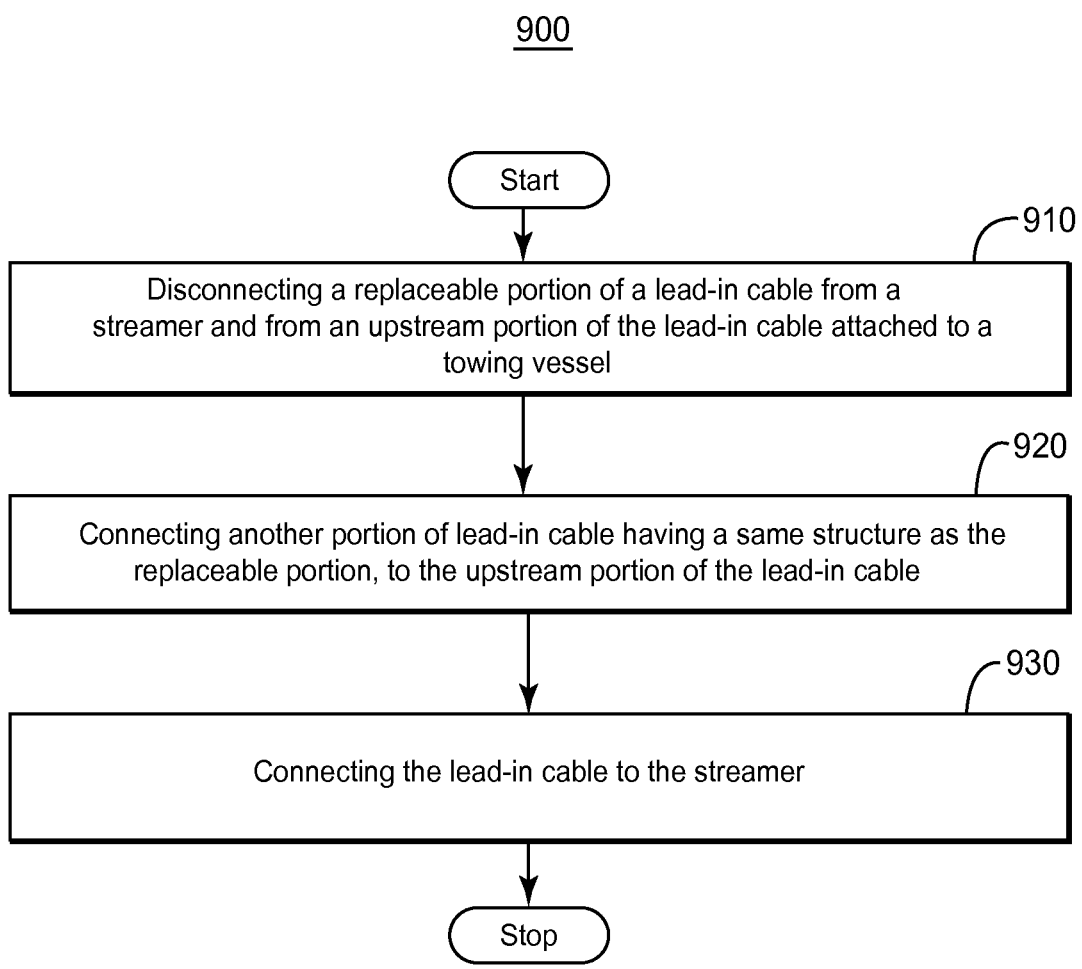
FIG. 9 is a flowchart of a method for lead-in cable related maintenance or repair at sea according to an embodiment.

Lead-in cables which have a replaceable portion or additional lead-in cables create the opportunity to shorten the maintenance or repair time related to the lead-in cables at sea (i.e., onboard a vessel during a marine survey). FIG. 9 is a flowchart of a method 900 for lead-in cable related maintenance or repair at sea according to an embodiment. Method 900 includes disconnecting a replaceable portion of a lead-in cable from a streamer and from an upstream portion of the lead-in cable that is attached to a towing vessel at 910. Method 900 further includes connecting another portion of lead-in cable having a same structure as the replaceable portion, to the upstream portion of the lead-in cable at 920. Method 900 also includes connecting the lead-in cable to the streamer at 930. Note that the other portion of lead-in cable may be first connected to the streamer and then to the upstream portion of the lead-in cable. Steps 910-930 may be performed onboard the vessel or in the water. By using method 900, the maintenance or repair time related to the lead-in cable is substantially reduced, for example, from two hours to twenty minutes.

Since the replaceable lead-in cable portions are substantially shorter than the typical lead-in cable, multiple portions of lead-in cable having different structures (e.g., different lengths, different locations of the bend restrictors, sections covered by different types of fairings, etc.) may be stored onboard the vessel. When the replaceable portion is damaged or during scheduled maintenance, another portion of lead-in cable having the same structure as the replaceable portion may be selected from the stored portions. Since besides time, space onboard vessels is also a scarce and expensive resource, storing volume for spare parts is reduced by storing replaceable portions instead of carrying and storing 1000-1500 m long lead-in cables. Thus, method 900 may further include storing portions of lead-in cable having different structures on the vessel, and selecting the other portion having the same structure as the replaceable portion among the stored portions.

The used replaceable portions may be inspected and repaired if necessary outside the maintenance/repair time. Thus method 900 may further include (A) inspecting the disconnected replaceable portion, and (B) repairing the disconnected replaceable portion, if the inspecting has indicated a repairable damage after the other portion has been connected to the upstream portion and the streamer.

Steps similar to 910-930 may be repeated for one or more other lead-in cables whose replaceable portion(s) may have the same or different structures. In one embodiment, when another streamer is towed behind the vessel using a different lead-in cable including a different replaceable portion attached to the other streamer, the method may further include:

disconnecting the different replaceable portion from an upstream portion of the different lead-in cable and the other streamer; and connecting a second other portion of lead-in cable having a same second structure as the different replaceable portion, to the upstream portion of the different lead-in cable and the other streamer.

The disclosed embodiments provide lead-in cables having at least two portions, lead-in additional cables and methods for reducing maintenance or repair time related to lead-in cables. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in particular combinations, each feature or element may be usable alone without the other features and elements of the embodiments or in other various combinations with or without other features and elements disclosed herein.

The written description uses examples of the subject matter disclosed to enable any person skilled in the art to practice the same, including making and using the described devices or systems and performing any of the described methods. The patentable scope of the subject matter is defined by the claims, and may include other examples that occur to those skilled in the art. Such examples are intended to be within the scope of the claims.

What is claimed is:

1. A lead-in cable usable to tow a streamer during a marine survey, the lead-in cable comprising:
    a first portion configured to be attached to a vessel; and
    a second replaceable portion configured to be removably connected between the first portion and the streamer, the second replaceable portion including:
        a body housing a functional cable,
        an upstream connector configured to attach the body to the first portion and to connect the functional cable, located within the body, to the first portion, to ensure functional communication with the vessel, and
        a downstream connector configured to attach the body to the streamer and to connect the functional cable to the streamer.

2. The lead-in cable of claim 1, wherein a bend restrictor surrounds a first length of the body at a predetermined location at which a separation rope is attached.

3. The lead-in cable of claim 2, wherein the bend restrictor is a preformed helical wrap-on rod.

4. The lead-in cable of claim 2, wherein the bend restrictor is located between the upstream connector and a second length of the body having solid or hairy fairings on an outer surface thereof.

5. The lead-in cable of claim 4, wherein the body has the solid fairings which include plural wings extending from the outer surface, and anti-stacking rings are fixedly mounted at a beginning, at an end and at predetermined intervals along the second length.

6. The lead-in cable of claim 4, wherein the second replaceable portion has a length of about 300 m and the second length is about 250 m.

7. The lead-in cable of claim 2, wherein the first length is about 12.5 m and the second replaceable portion has a length of about 20 m.

8. The lead-in cable of claim 2, wherein an additional bend restrictor surrounds a second bend length along the body at a second location.

9. The lead-in cable of claim 8, wherein the second location is closer to the streamer than the first location and the second bend length is shorter than the first length.

10. The lead-in cable of claim 1, wherein the functional cable is one or more of a power cable, telemetry cables, transmission cables, a data cable, and a fiber optic cable.

11. A lead-in additional cable configured to be inserted between a lead-in cable and a streamer, the lead-in additional cable comprising:
    a body housing a functional cable;
    an upstream connector configured to attach the body to the lead-in cable and to connect the functional cable, located within the body, to the lead-in cable to ensure functional communication; and
    a downstream connector configured to attach the body to the streamer and to connect the functional cable to the streamer.

12. The lead-in additional cable of claim 11, wherein the lead-in additional cable covers a portion most likely to be damaged between the streamer and the towing vessel.

13. The lead-in additional cable of claim 11, further comprising:
    a bend restrictor configured to surround a first length of the body at a predetermined location.

14. The lead-in additional cable of claim 11, wherein the body has hairy fairings or solid fairings on an outer surface thereof.

15. A method for lead-in cable related maintenance or repair, the method comprising:
    disconnecting a replaceable second portion of a lead-in cable from a streamer and from a first portion of the lead-in cable, wherein the first portion is attached to a vessel;

connecting an upstream connector of another replaceable second portion, having a same structure as the replaceable second portion, to the first portion of the lead-in cable; and connecting a downstream connector of the another replaceable second portion to the streamer, wherein the another replaceable second portion has a body and the upstream and downstream connectors, and the body houses within a functional cable that connects the vessel to the streamer.

16. The method of claim 15, wherein the another replaceable second portion extends over at least one section subjected to forces in addition to a towing force transmitted along the lead-in cable.

17. The method of claim 15, wherein the functional cable includes one or more of a power cable, telemetry cables, transmission cables, a data cable, a fiber optic cable.

18. The method of claim 15, further comprising:

storing portions of lead-in cable having different structures on the vessel; and selecting the other portion having the same structure as the another replaceable second portion from among the stored portions.

19. The method of claim 15, further comprising:

inspecting the disconnected replaceable second portion; and repairing the disconnected replaceable second portion, if the inspecting has indicated a repairable damage, wherein the inspecting and the repairing are performed after the other portion has been connected to the first portion and the streamer.

20. The method of claim 15, wherein another streamer is towed behind the vessel using a different lead-in cable including a different replaceable portion attached to the other streamer, the method further comprising:

disconnecting the different replaceable portion from an upstream portion of the different lead-in cable and the other streamer; and connecting a second other portion of lead-in cable having a same second structure as the different replaceable portion, to the upstream portion of the different lead-in cable and the other streamer.

* * * * *